Feb. 19, 1929.　　　　　　　　H. WIRTH　　　　　　　　1,702,329
TRAP
Filed Feb. 7, 1928
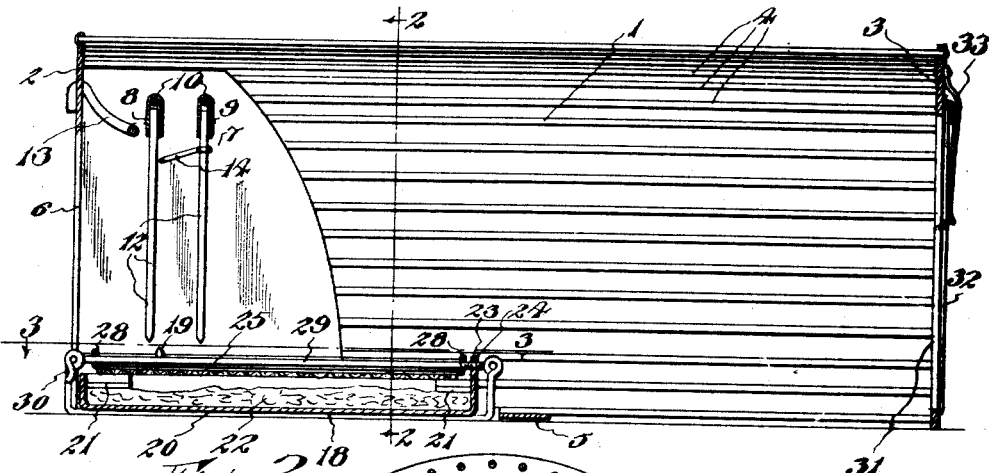
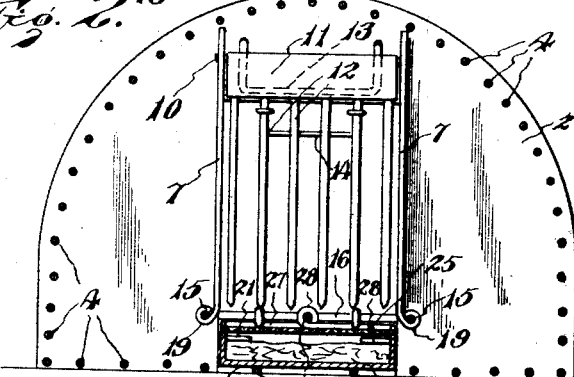
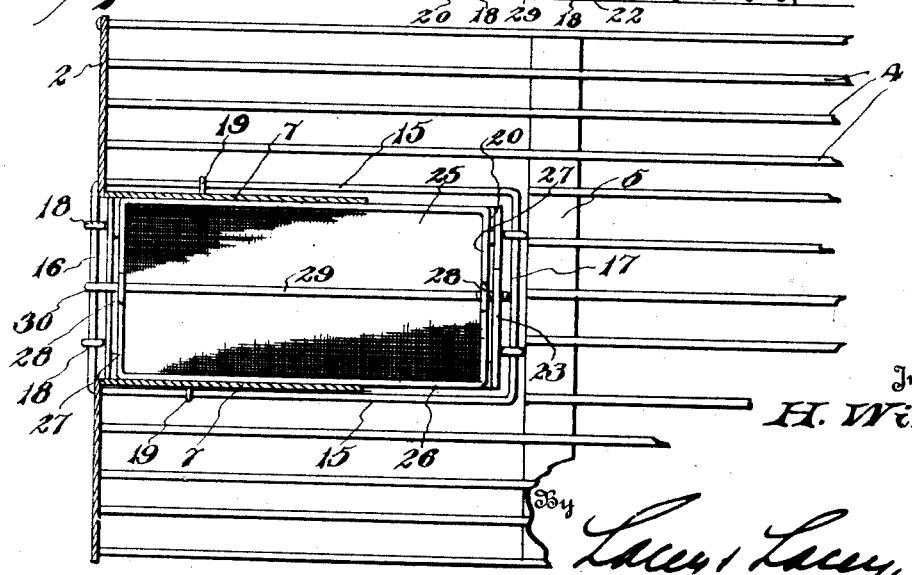
Inventor
H. Wirth
By Lacey & Lacey, Attorney Patented Feb. 19, 1929.

1,702,329

UNITED STATES PATENT OFFICE.

HENRY WIRTH, OF TANANA, TERRITORY OF ALASKA.

TRAP.

Application filed February 7, 1928. Serial No. 252,563.

This invention relates to fishing and trapping and more particularly to a trap in which rats and other small animals may be caught.

One object of the invention is to provide a trap including a body into which an animal may pass but cannot escape and thereby cause the animal to be caught alive and confined in the trap.

Another object of the invention is to provide the trap with an entrance having improved means to permit the animals to enter the trap but prevent them from passing outwardly through the inlet opening thereof and also to mount adjacent the inlet a bait holder which is so located that it will entice the animal into the body of the trap.

Another object of the invention is to mount the bait holder for movement into and out of the body of the trap so that it can be drawn outwardly in order to replenish the bait and then moved into the trap.

Another object of the invention is to cover the bait with a shield which will prevent the animal from consuming the bait and to provide improved means to releasably but securely retain the shield or guard in covering relation to the bait.

The invention is illustrated in the accompanying drawing, wherein

Figure 1 is a longitudinal sectional view through the trap;

Fig. 2 is a transverse sectional view taken on the line 2—2 of Fig. 1, and

Fig. 3 is a sectional view taken on the line 3—3 of Fig. 1.

The improved trap comprises a housing or body 1 having heads 2 and 3 at its ends formed of metal and preferably joined by longitudinally extending rods 4, although wire may be substituted for the rods if so desired. A metal strip 5 extends transversely across the bottom of the trap to reinforce the bottom forming rods and constitute a support for the forward ends of certain of the rods which terminate in spaced relation to the forward end of the trap, as shown in Fig. 3.

The head 2 at the forward end of the body is provided with an entrance opening 6 and carries plates 7 which project into the body of the trap at opposite sides of the inlet and constitute baffles or walls to prevent an animal from entering the trap without passing the guards 8 and 9. The guards are disposed between the walls or plates 7 and each includes a rod 10 mounted in openings formed in the plates and carrying a yoke 11 formed of sheet metal folded to straddle the rod and carrying depending prongs 12. The prongs are sharpened at their lower ends and the outer guard has certain of its prongs shorter than its remaining prongs, as shown in Fig. 1, so that an animal may pass the outer guard with comparative ease when moving inwardly. An abutment 13 extends inwardly from the head 2 above the inlet opening to prevent the outer guard from swinging outwardly a sufficient distance to permit the animal to draw itself rearwardly out of the trap after having moved inwardly a sufficient distance to be disposed beneath the guard and the inner guard carries an abutment 14 to engage the outer guard and thereby limit its outward swinging movement. It will thus be seen that an animal may enter the trap but since it cannot reach the inlet opening except by passing between the walls 7 and the guards are suspended between its walls, it will be impossible for the animal to escape through the inlet.

The bait holder includes a frame preferably formed of wire and having side bars 15 joined by inner and outer end bars 16 and 17 which constitute supports to which the ends of the longitudinally extending intermediate rods or wires 18 are secured, as shown in Figs. 1 and 3. It will be understood that additional intermediate rods may be provided if so desired. The side bars 15 pass through openings formed in the head 2 adjacent its lower end at opposite sides of the inlet thereby slidably mounting the frame so that it may be moved into and out of the body of the trap. Guides 19 which are carried by the walls 7 may be provided to guide sliding movement of the frame and prevent the frame from dropping downwardly out of proper position. Within the frame there is disposed a pan 20 formed of metal and adjacent its inner and outer ends having its side walls provided with tongues 21 which project toward each other and are intended to overlap bait, such as a strip of meat 22 or any other suitable material attractive to the animal to be caught, and firmly hold the bait in the pan. A tongue 23 projects upwardly from the inner end of the pan and is formed with a threaded opening 24. In order to shield the bait and prevent it from being consumed by the animal, I have provided a cover 25 which may be formed of wire and includes a bordering frame 26 having its end bars 27 twisted to define eyes 28 through which a securing pin 29 extends. By referring to Fig. 1, it will be seen that the inner end of the pin 26 is threaded so that it may be screwed into the opening 24 of the tongue 23 and at its outer end the pin is bent to provide a hook 30 to engage the outer cross bar 16 of the pan carrying frame. By this arrangement the shield or cover may be securely held in place to prevent an animal from consuming the bait but after the bait holder has been slid outwardly the rod may be unscrewed in order to permit the shield to be raised and the bait renewed when necessary. The pan is secured in its supporting frame so that it cannot be dragged loose by an animal without entering the trap.

When the trap is in use, the bait is placed in the pan with the frame drawn outwardly and after the cover or shield has been set in place and secured the bait holder is slid into the trap. When an animal approaches the trap, it is enticed into the trap by the bait and the guards 8 and 9 allow the animal to move inwardly but prevent it from withdrawing or passing out through the inlet after it has once entered the trap. Therefore, the animal will be confined in the trap and cannot escape. An outlet opening 31 is formed in the rear head 3 and is provided with a door or closure 32 hinged to the rear head and normally held shut by a spring or other suitable fastener 33. If desired, a latch may be provided in addition to the spring 33 to retain the closure shut. I have, therefore, provided a trap into which an animal may easily pass through the inlet and in which it will be securely confined until killed and removed through the outlet opening or otherwise disposed of.

Having thus described the invention, I claim:

1. In a trap, a body having heads at its front and rear, the front head being provided with an inlet, guard means to prevent an animal passing outwardly through the inlet, and a bait holder in the body movable beneath the guard means into and out of the body through the inlet.

2. In a trap, a body having heads at its front and rear, the front head being provided with an inlet, guard means to prevent an animal passing outwardly through the inlet, and a bait holder slidably mounted for movement through the lower portion of the inlet beneath the guard means into and out of the body.

3. In a trap, a body having heads at its front and rear, the front head being provided with an inlet, guard means to prevent an animal passing outwardly through the inlet, and a bait holder slidably mounted for movement through the inlet beneath the guard means into and out of the body and when in an operative position within the body extending from the inlet below the guard means.

4. In a trap, a body having heads at its front and rear, the front head being provided with an inlet, baffles extending into the body at opposite sides of the inlet, guard means mounted between the baffles to prevent an animal passing outwardly through the inlet, and a bait holder slidably mounted and movable through the inlet beneath the guard means into and out of the body.

5. In a trap, a body having heads at its front and rear, the front head being provided with an inlet, means to prevent an animal passing outwardly through the inlet, a bait holder including a frame having side bars passed through openings in the front head at opposite sides of the inlet to slidably mount the frame for movement into and out of the body, and a cover for said frame.

6. In a trap, a body having heads at its front and rear, the front head being provided with an inlet, means to prevent an animal passing outwardly through the inlet, a bait holder including a frame having side bars passed through openings in the front head at opposite sides of the inlet to slidably mount the frame for movement into and out of the body, a pan in said frame having means to secure bait therein, and a cover for said pan releasably held in covering relation thereto.

7. In a trap, a body having heads at its front and rear, the front head being provided with an inlet, means to prevent an animal passing outwardly through the inlet, a bait holder including a frame having side bars passed through openings in the front head at opposite sides of the inlet to slidably mount the frame for movement into and out of the body, a pan in said frame having means to secure bait therein, a tongue at the inner end of said pan, a cover for said pan, and a pin extending longitudinally of the cover with its inner end engaged with the tongue and its outer end engaged with the forward end of said frame.

In testimony whereof I affix my signature.

HENRY WIRTH. [L. S.]